United States Patent
Tomiyama (12) United States Patent (10) Patent No.: US 10,508,708 B1
(45) Date of Patent: Dec. 17, 2019

(54) TORQUE FLUCTUATION INHIBITING DEVICE

(71) Applicant: EXEDY Corporation, Neyagawa-shi, Osaka (JP)

(72) Inventor: Naoki Tomiyama, Neyagawa (JP)

(73) Assignee: EXEDY CORPORATION, Neyagawa-shi, Osaka (JP)

(*) Notice: Subject to any disclaimer, the term of this patent is extended or adjusted under 35 U.S.C. 154(b) by 0 days.

(21) Appl. No.: 16/299,874

(22) Filed: Mar. 12, 2019

(30) Foreign Application Priority Data

Jun. 15, 2018 (JP) .................................. 2018-114167

(51) Int. Cl.
*F16F 15/14* (2006.01)
*F16H 45/02* (2006.01)

(52) U.S. Cl.
CPC .......... *F16F 15/145* (2013.01); *F16H 45/02* (2013.01); *F16H 2045/0263* (2013.01)

(58) Field of Classification Search
CPC ....... F16F 15/145; F16F 15/1407; F16F 15/14
See application file for complete search history.

(56) References Cited

FOREIGN PATENT DOCUMENTS

| DE | 102016112790 A1 * | 1/2017 | ............ F16F 15/145 |
| JP | 2017053467 A * | 3/2017 | ............ F16F 15/31 |
| JP | 2018-013153 A | 1/2018 | |

OTHER PUBLICATIONS

Machine Translation of JP 2017-053467, obtained May 23, 2019.*
Machine Translation of DE 10 2016 112 790, obtained May 23, 2019.*

* cited by examiner

*Primary Examiner* — Richard W Ridley
*Assistant Examiner* — Brian J McGovern
(74) *Attorney, Agent, or Firm* — United IP Counselors, LLC (57) ABSTRACT

A torque fluctuation inhibiting device is disclosed. The device includes a mass body, centrifugal elements, guide members, and cam mechanisms. The mass body is rotatable in accordance with and relative to the rotor. The centrifugal elements are radially movable, and disposed to receive a centrifugal force by the rotor and the mass body. The guide members are provided on circumferential ends of each centrifugal element, and guide movement of each centrifugal element while supported by one of the rotor and the mass body. The cam mechanisms convert the centrifugal force into a circumferential force when a relative displacement occurs between the rotor and the mass body while the centrifugal force acts on each centrifugal element. The cam mechanisms each include a cam provided on the other of the rotor and the mass body, and a cam follower disposed on a straight line connecting the guide members in each centrifugal element.

9 Claims, 6 Drawing Sheets

TORQUE FLUCTUATION INHIBITING DEVICE

CROSS-REFERENCE TO RELATED APPLICATIONS

This application claims priority to Japanese Patent Application No. 2018-114167, filed Jun. 15, 2018. The contents of that application are incorporated by reference herein in their entirety.

TECHNICAL FIELD

The present disclosure relates to a torque fluctuation inhibiting device, particularly to a torque fluctuation inhibiting device for inhibiting torque fluctuations in a rotor, to which a torque is inputted, and that is rotated about a rotational axis.

BACKGROUND ART

For example, a clutch device, including a damper device, and a torque converter are provided between an engine and a transmission in an automobile. For reduction in fuel consumption, the torque converter is provided with a lock-up device for mechanically transmitting a torque at a predetermined rotational speed or greater.

Japan Laid-open Patent Application Publication No. 2018-013153 describes a lock-up device including a torque fluctuation inhibiting device. The torque fluctuation inhibiting device described in Japan Laid-open Patent Application Publication No. 2018-013153 includes an inertia ring, a plurality of centrifugal elements and a plurality of cam mechanisms. The inertia ring is rotatable relative to a hub flange to which a torque is transmitted, and a centrifugal force acts on each centrifugal element in rotation of the hub flange and the inertia ring. Each cam mechanism includes a cam provided on the surface of each centrifugal element and a cam follower making contact with the cam.

In the device described in Japan Laid-open Patent Application Publication No. 2018-013153, when the hub flange and the inertia ring are displaced in a rotational direction by torque fluctuations, each cam mechanism is actuated in response to the centrifugal force acting on each centrifugal element, and converts the centrifugal force acting on each centrifugal element into a circumferential force directed to reduce the displacement between the hub flange and the inertia ring. Torque fluctuations are inhibited by this circumferential force.

In the aforementioned device described in Japan Laid-open Patent Application Publication No. 2018-013153, as shown in FIG. 9, two right-side guide rollers and two left-side guide rollers, i.e., two pairs of guide rollers are disposed to stably move each centrifugal element in a radial direction.

In the torque fluctuation inhibiting device described in Japan Laid-open Patent Application Publication No. 2018-013153, the hub flange is provided with a plurality of recessed portions in the outer peripheral part thereof. The recessed portions are opened radially outward. The centrifugal elements are accommodated in the recessed portions, respectively, while being radially movable therein. In such a configuration, gaps are produced between the both circumferential lateral parts of each centrifugal element and sidewalls opposed thereto in each recessed portion. The gaps cannot be eliminated due to the structure of the torque fluctuation inhibiting device.

With the aforementioned gaps between each centrifugal element and each recessed portion, each centrifugal element tilts during actuation of the torque fluctuation inhibiting device. In accordance with the tilt of each centrifugal element, the profile of the cam provided on the outer peripheral surface of each centrifugal element is displaced from a designed profile, whereby a desired torsional characteristic (a characteristic indicating a relation between an angle at which the hub flange and the inertia ring are rotated relative to each other and a torque transmitted between the hub flange and the inertia ring) cannot be obtained. Additionally, the timing of tilt of each centrifugal element depends on the frequency of torque fluctuations. This results in a drawback of fluctuations in torsional characteristics.

In view of the above, when two pairs of guide rollers are provided as shown in FIG. 9 of Japan Laid-open Patent Application Publication No. 2018-013153, tilt of each centrifugal element can be inhibited to some extent. However, installation of the two pairs of guide rollers requires an attachment space radially enlarged as much as possible.

BRIEF SUMMARY

It is an object of the present disclosure to inhibit tilt of a cam surface without radially enlarging an attachment space and obtain stable torsional characteristics.

(1) A torque fluctuation inhibiting device according to the present disclosure is a device for inhibiting torque fluctuations in a rotor to which a torque is inputted. The torque fluctuation inhibiting device includes a mass body, a plurality of centrifugal elements, a pair of guide members and a plurality of cam mechanisms. The mass body is disposed to be rotatable in accordance with the rotor and be rotatable relative to the rotor. The plurality of centrifugal elements are radially movable, and each of the plurality of centrifugal elements is disposed to receive a centrifugal force generated by rotation of the rotor and the mass body. The pair of guide members is provided on both circumferential ends of the each of the plurality of centrifugal elements, and guides movement of the each of the plurality of centrifugal elements while being supported by one of the rotor and the mass body. When a relative displacement is produced between the rotor and the mass body in a rotational direction while the centrifugal force is acting on the each of the plurality of centrifugal elements, the plurality of cam mechanisms each convert the centrifugal force into a circumferential force directed to reduce the relative displacement. The plurality of cam mechanisms each include a cam and a cam follower. The cam is provided on the other of the rotor and the mass body. The cam follower is moved along the cam, and is disposed on a straight line connecting the pair of guide members in the each of the plurality of centrifugal elements.

When a torque is inputted to the rotor in this device, the rotor and the mass body are rotated. When the torque inputted to the rotor does not fluctuate, relative displacement is not produced between the rotor and the mass body in the rotational direction. On the other hand, when the torque inputted to the rotor fluctuates, the relative displacement is produced between the mass body and the rotor in the rotational direction (the displacement will be hereinafter expressed as "rotational phase difference" on an as-needed basis) depending on the extent of torque fluctuations, because the mass body is disposed to be rotatable relative to the rotor.

When the rotor and the mass body are herein rotated, a centrifugal force acts on each centrifugal element. Then, when the relative displacement is produced between the rotor and the mass body in the rotational direction, each cam mechanism is actuated and converts the centrifugal force acting on each centrifugal element into a circumferential force. The circumferential force acts to reduce the relative displacement between the rotor and the mass body. Torque fluctuations are inhibited by the herein described actuation of each cam mechanism.

Moreover, the cam is herein provided on either the rotor or the mass body provided as a different member from each centrifugal element. Because of this, even in tilt of each centrifugal element, the cam is unlikely to change in profile, whereby it is possible to obtain relatively stable torsional characteristics. Especially, the cam follower is disposed on the straight line connecting the pair of guide members. Hence, even in tilt of each centrifugal element, ratio of change in, e.g., position of the cam follower with respect to the cam is reduced. Besides, movement of each centrifugal element is guided by the pair of guide members. Hence, a radial attachment space can be made compact.

(2) Preferably, each of the cam follower and the pair of guide members has a circular cross-section. Additionally, a center of the cam follower is located on a straight line connecting centers of the pair of guide members.

In this case, in tilt of each centrifugal element, each centrifugal element is configured to tilt about a fulcrum, i.e., the center of the cam follower. Because of this, even in tilt of each centrifugal element, fluctuation in contact point between the cam follower and the cam can be inhibited.

(3) Preferably, the center of the cam follower is located on a midpoint of the straight line connecting the centers of the pair of guide members.

In this case, even in tilt of each centrifugal element, fluctuation in contact point between the cam follower and the cam can be further inhibited.

(4) Preferably, the mass body has an annular shape. Additionally, the cam is provided on part of the mass body, and is a curved surface recessed radially outward in a circular-arc shape.

In this case, the cam is provided on the mass body. In other words, each centrifugal element provided with the cam follower is supported and guided by the rotor not by the mass body. Because of this, the amount of inertia of each centrifugal element is not added to that of the mass body. Therefore, the amount of inertia of the mass body is stabilized, and torsional characteristics are stabilized as well.

(5) Preferably, the cam follower is disposed to make contact with an outermost peripheral point on the cam while the rotor and the mass body are not being rotated relative to each other. Additionally, a contact point between the cam and the cam follower is constant regardless of a posture of the each of the plurality of centrifugal elements while the rotor and the mass body are not being rotated relative to each other.

Here, even in tilt of each centrifugal element, the contact point between the cam and the cam follower is constant. Because of this, in torsional characteristics, a stable characteristic is obtained when the torsion angle (an angle of relative rotation between the rotor and the mass body) is "0".

(6) Preferably, the rotor includes a plurality of pairs of support portions protruding to an outer peripheral side. Additionally, the pair of guide members makes contact with circumferentially outer sides of each pair of the plurality of pairs of support portions, and is radially moved along the each pair of the plurality of pairs of support portions.

Here, the pair of guide members makes contact with the circumferentially outer sides of each pair of support portions, respectively. Because of this, in tilt of each centrifugal element, the pair of guide members makes contact with each pair of support portions, whereby each centrifugal element can be prevented from jumping out to the outer peripheral side. Additionally, when the pair of guide members makes contact with each pair of support portions, each centrifugal element does not tilt any more from the contact position. Moreover, each centrifugal element is moved while the pair of guide members interposes each pair of support portions therebetween. Hence, wobble does not occur between each centrifugal element and the rotor during movement of each centrifugal element.

(7) Preferably, the pair of guide members is a pair of guide rollers rotatably supported by the each of the plurality of centrifugal elements. In this case, movement of each centrifugal element is made smooth.

(8) Preferably, the cam follower is a roller rotatably supported by the each of the plurality of centrifugal elements. In this case, actuation of each cam mechanism is made smooth.

(9) Preferably, the each of the plurality of centrifugal elements has a circumferentially extending shape. Additionally, the each of the plurality of centrifugal elements includes an imbalance portion for setting a center of gravity thereof to deviate from a circumferential center thereof to one circumferential side.

In this case, the center of gravity of each centrifugal element deviates from the circumferential center of each centrifugal element. Because of this, each centrifugal element tilts in a predetermined direction whenever a centrifugal force acts on each centrifugal element. Then, each centrifugal element is configured to be radially moved, while keeping the tilt posture. Therefore, torsional characteristics can be inhibited from becoming unstable.

(10) Preferably, the each of the plurality of centrifugal elements includes a first plate and a second plate. The first and second plates are disposed in axial opposition to each other, and each extend circumferentially. Additionally, the pair of guide members each includes a pin fixing the first plate and the second plate, and a guide roller rotatably supported by the pin.

Overall, according to the present disclosure described above, it is possible to inhibit tilt of a cam surface without radially enlarging an attachment space and obtain stable torsional characteristics.

DETAILED DESCRIPTION

Figure 1:
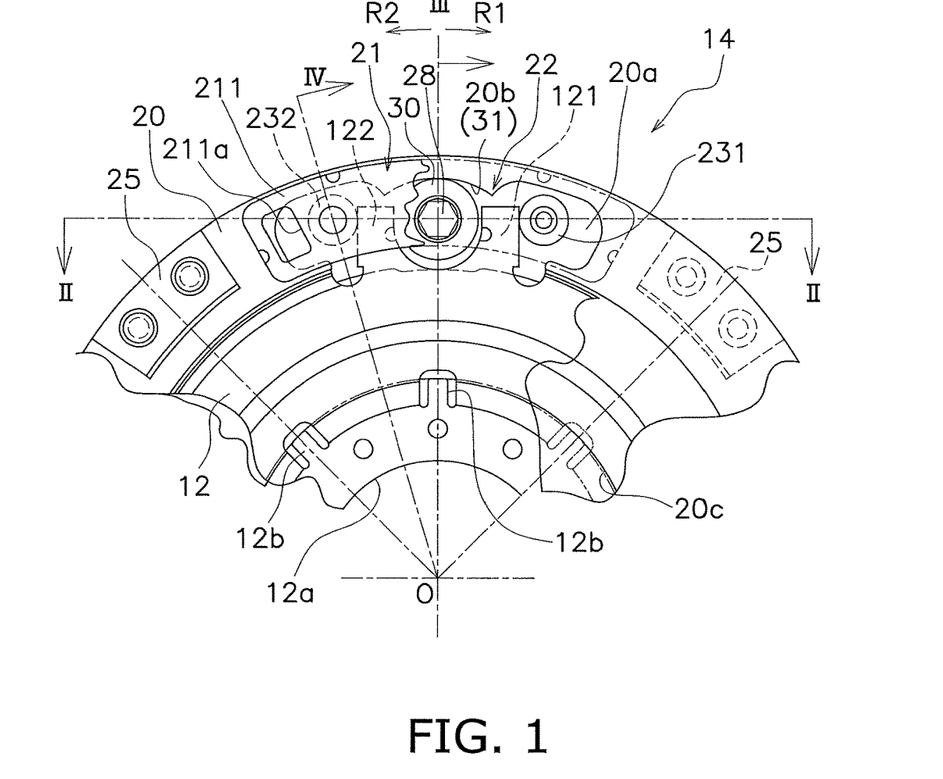
FIG. 1 is a front view of part of a torque fluctuation inhibiting device and related members thereof according to a preferred embodiment of the present disclosure.
Figure 2:
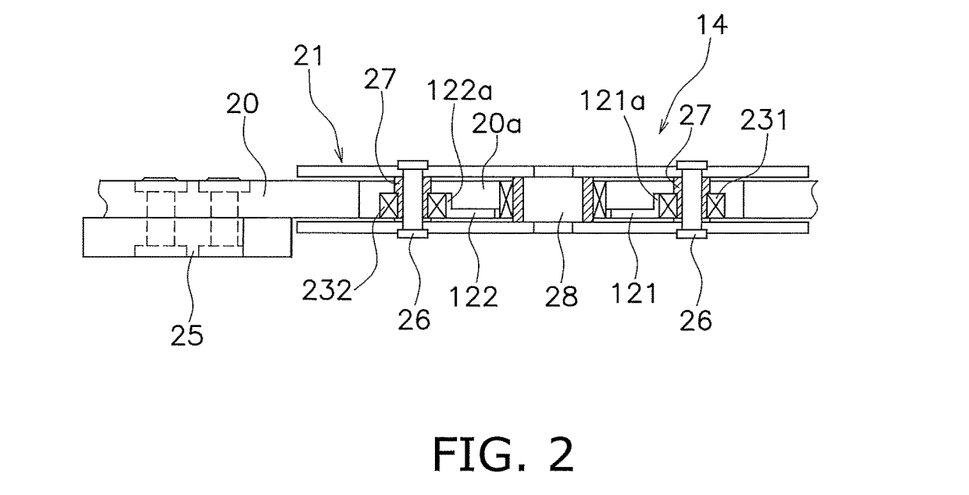
FIG. 2 is a cross-sectional view of FIG. 1 taken along line II-II.
Figure 3:
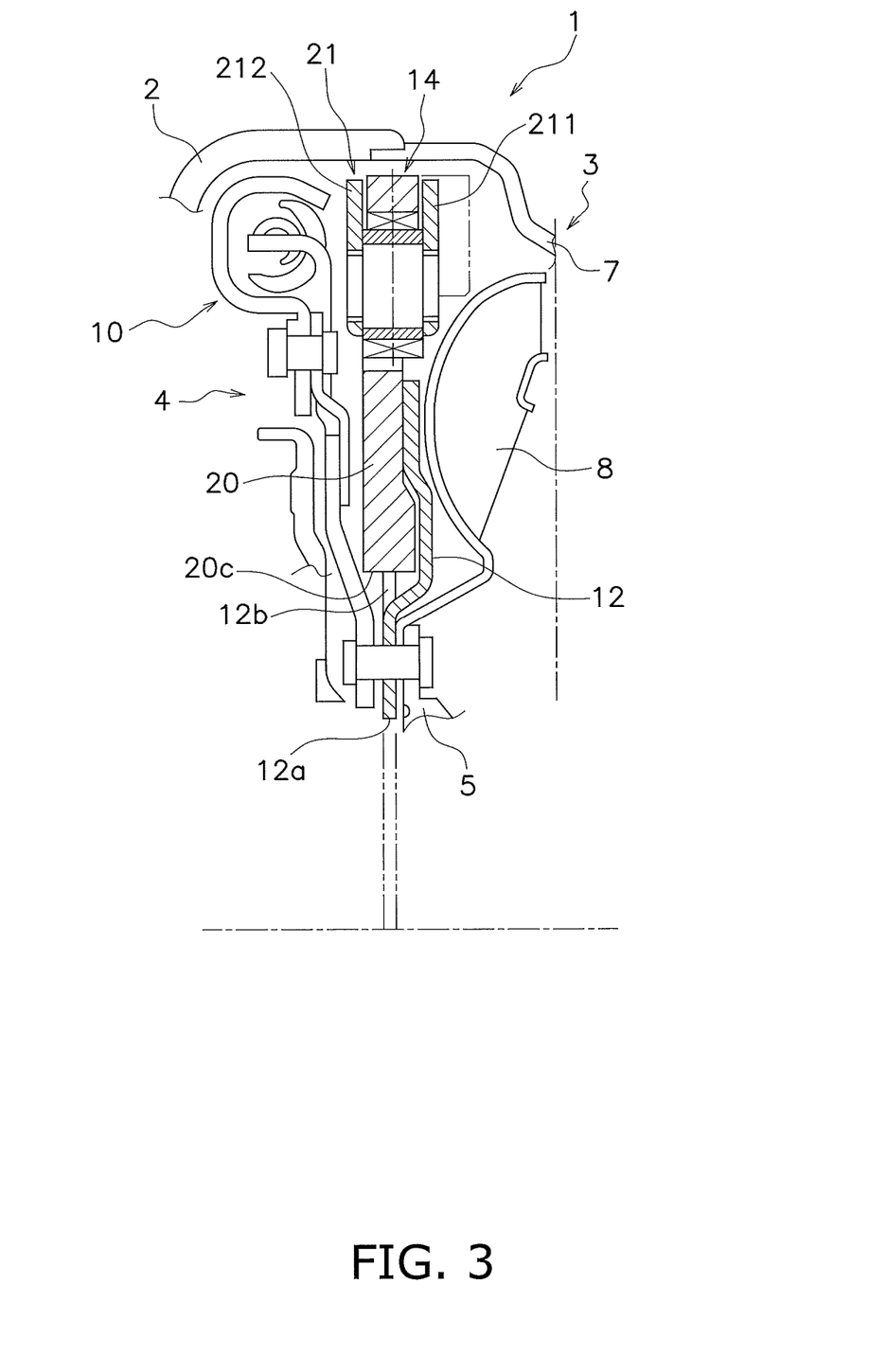
FIG. 3 is a cross-sectional view of FIG. 1 taken along line O-III.
Figure 4:
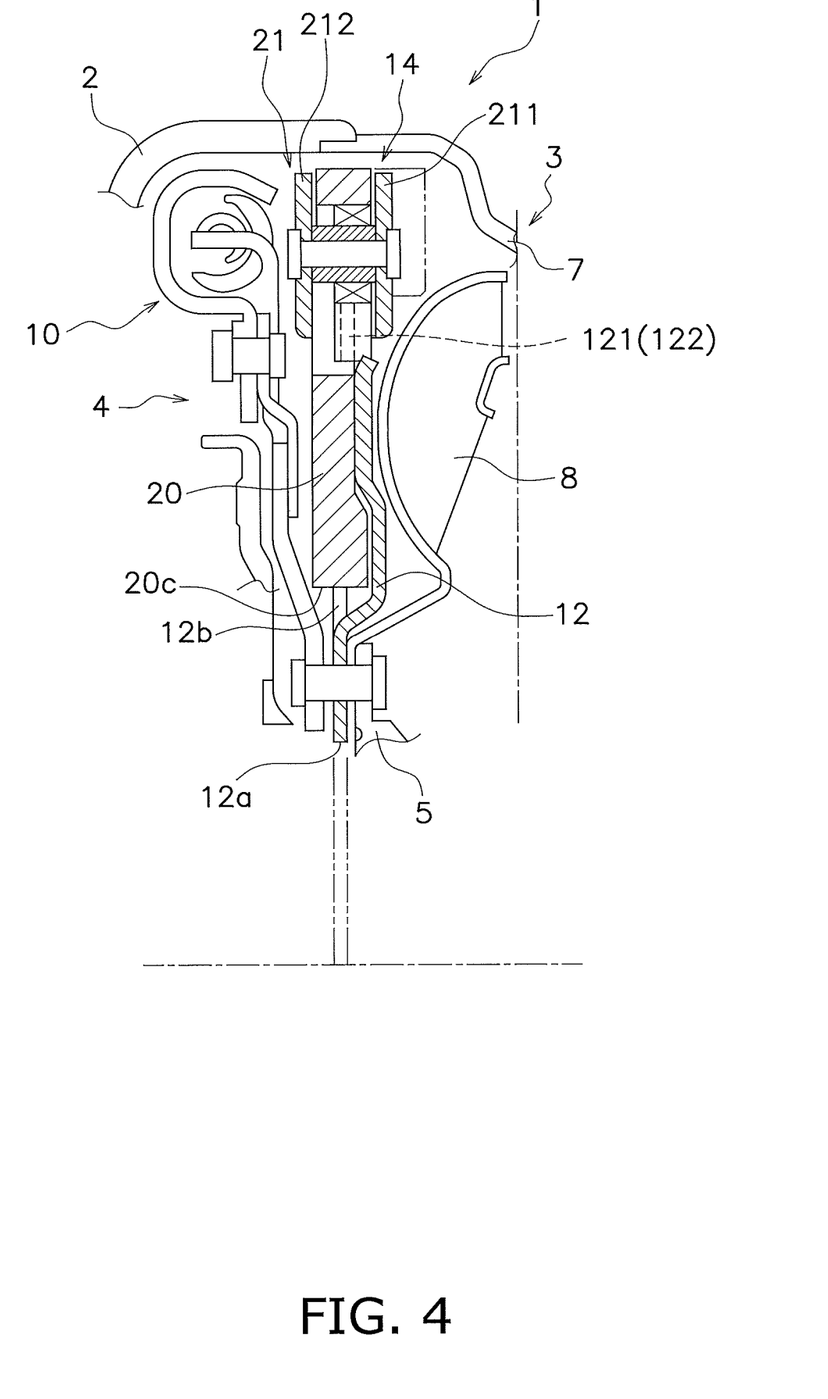
FIG. 4 is a cross-sectional view of FIG. 1 taken along line O-IV.
Figure 5:
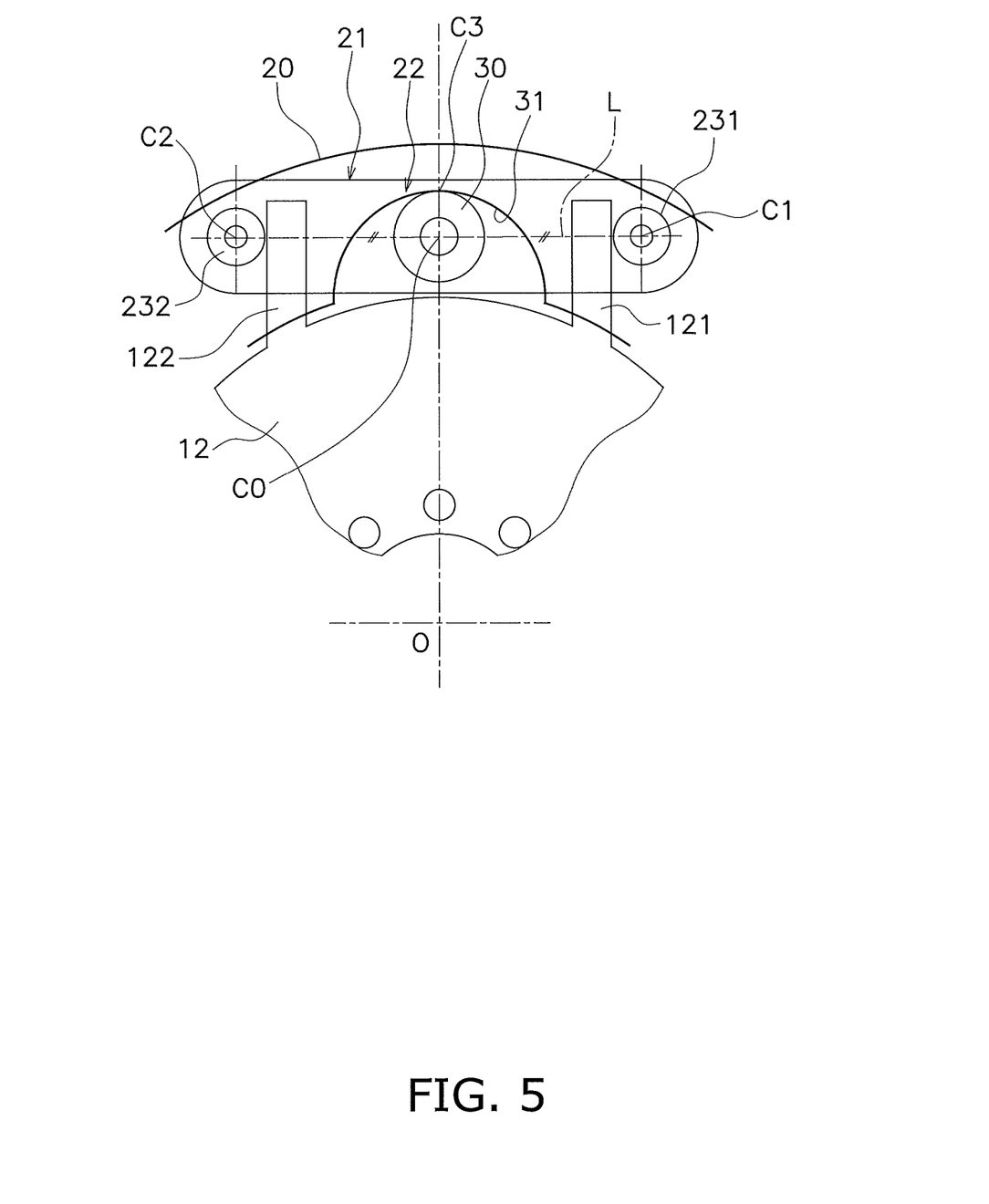
FIG. 5 is a schematic diagram of each centrifugal element and each cam mechanism shown in FIG. 1.
Figure 6:
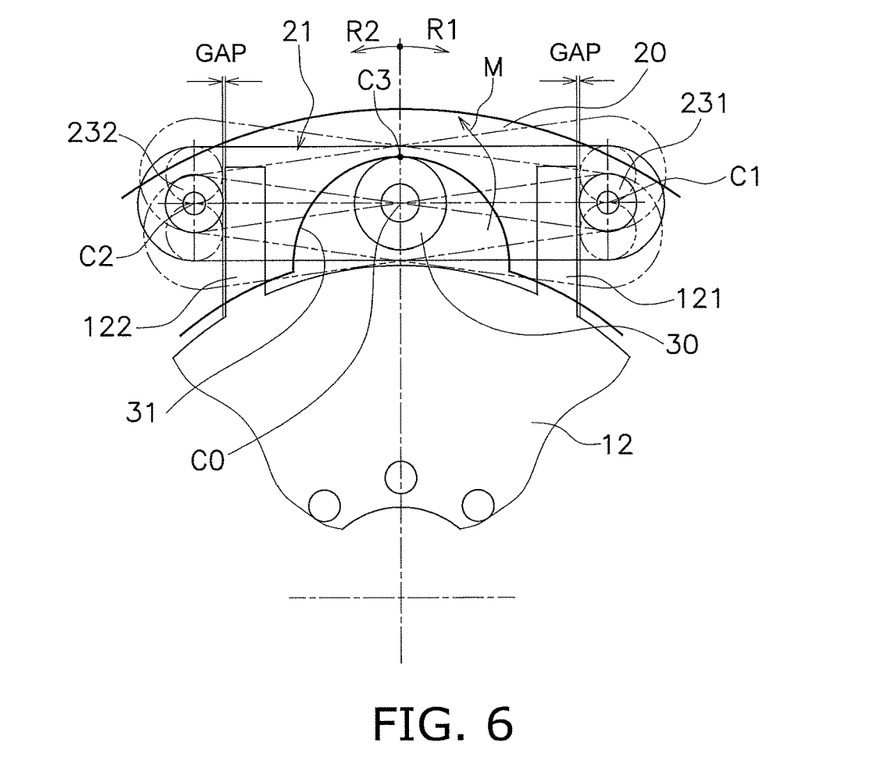
FIG. 6 is a diagram showing tilt of each centrifugal element shown in the schematic diagram of FIG. 5.

FIG. 1 shows an example that a torque fluctuation inhibiting device according to a preferred embodiment of the present disclosure is applied to a lock-up device for a torque converter. Except for members related to the torque fluctuation inhibiting device, members composing the lock-up device and so forth are omitted in FIG. 1. FIGS. 2 to 4 are views of FIG. 1 taken along different cross sections. It should be noted that the torque converter and the lock-up device are shown only in part in FIGS. 3 and 4. In FIG. 1, "O" indicates a rotational axis of the torque converter. On the other hand, for convenience of explanation, respective members in FIG. 1 are schematically shown in FIGS. 5 and 6.

[Entire Configuration]

With reference to FIGS. 3 and 4, a torque converter 1 includes a front cover 2, a torque converter body 3, a lock-up device 4 and an output hub 5. A torque is inputted to the front cover 2 from an engine. The torque converter body 3 includes an impeller 7 coupled to the front cover 2, a turbine 8 and a stator (not shown in the drawings). The turbine 8 is coupled to the output hub 5, and an input shaft of a transmission (not shown in the drawings) is capable of being spline-coupled to the inner peripheral part of the output hub 5.

[Lock-Up Device 4]

The lock-up device 4 includes a clutch part (not shown in the drawings), and is settable to a lock-up on state and a lock-up off state. In the lock-up on state, the torque inputted to the front cover 2 is transmitted to the output hub 5 through the lock-up device 4 without through the torque converter body 3. On the other hand, in the lock-up off state, the torque inputted to the front cover 2 is transmitted to the output hub 5 through the torque converter body 3.

The lock-up device 4 includes an input-side rotor (not shown in the drawings), a damper part 10, a hub flange 12 (exemplary rotor) and a torque fluctuation inhibiting device 14.

The damper part 10 is disposed between an input-side member and both the output hub 5 and the hub flange 12. The damper part 10 includes a plurality of torsion springs. The damper part 10 transmits the torque, transmitted thereto from the input-side member, to an output side, and absorbs and attenuates torque fluctuations.

The hub flange 12 is coupled to an output side of the damper part 10, while being coupled to the output hub 5.

[Torque Fluctuation Inhibiting Device 14]

The torque fluctuation inhibiting device 14 will be explained with reference to FIGS. 1 to 4. It should be noted that FIG. 1 shows part of the hub flange 12 and the torque fluctuation inhibiting device 14. As a whole, the part shown in FIG. 1 is disposed in each of four positions aligned at equal angular intervals in a circumferential direction.

The torque fluctuation inhibiting device 14 includes an inertia ring 20 (exemplary mass body), four centrifugal elements 21, four cam mechanisms 22, and four pairs of guide rollers 231 and 232 (exemplary guide member), each pair of which is provided in each centrifugal element 21.

<Inertia Ring 20>

The inertia ring 20 has an annular shape and includes four openings 20a in the outer peripheral part thereof. The inertia ring 20 has a rotational axis that is the same as the rotational axis O of the hub flange 12. The inertia ring 20 is rotatable in accordance with the hub flange 12, and is also rotatable relative to the hub flange 12.

The four openings 20a are disposed at equal angular intervals in the circumferential direction so as to be set in corresponding positions to the four cam mechanisms 22. Each opening 20a has a circumferentially extending shape. Each opening 20a is provided with a curved surface 20b on a circumferential middle part thereof. The curved surface 20b is recessed radially outward in a circular-arc shape. The curved surface 20b functions as a cam 31 (to be described) of each cam mechanism 22.

It should be noted that a plurality of weights 25 are fixed to the inertia ring 20 so as to increase the inertia amount of the inertia ring 20.

<Hub Flange 12>

The hub flange 12 is a disc-shaped plate member including a hole 12a in the middle part thereof. As shown in FIGS. 3 and 4, the hub flange 12 is disposed along a lateral surface of the inertia ring 20. The inner peripheral part of the hub flange 12 is located on the inner peripheral side of the inertia ring 20, while the end of the inner peripheral part thereof is coupled to the output hub 5.

The hub flange 12 is provided with four pairs of guide protrusions 121 and 122 on the outer peripheral part thereof such that each pair of guide protrusions 121 and 122 is disposed in a corresponding position to each opening 20a of the inertia ring 20. In other words, the hub flange 12 includes four pairs of guide protrusions 121 and 122. The guide protrusions 121 and 122 are shaped to protrude from the outer peripheral surface of the hub flange 12 further radially outward, and are set off in the axial direction (see FIG. 4). In more detail, as shown in FIG. 2, each pair of guide protrusions 121 and 122 is disposed in each opening 20a of the inertia ring 20. A circumferentially outer part of each guide protrusion 121, 122 is bent in part in the axial direction, and is provided as a support portion 121a, 122a with which each guide roller 231, 232 makes contact.

As shown in FIGS. 1, 3 and 4, the hub flange 12 includes a plurality of positioning portions 12b in the inner peripheral part thereof. The positioning portions 12b are formed by cutting and raising part of the inner peripheral part of the hub flange 12. An inner peripheral surface 20c of the inertia ring 20 makes contact with the outer peripheral surfaces of the positioning portions 12b, whereby the inertia ring 20 is radially positioned with respect to the hub flange 12.

<Centrifugal Element 21, Guide Rollers 231 and 232 and Cam Follower 30>

Each centrifugal element 21 is radially movable within each opening 20a of the inertia ring 20. Each centrifugal element 21 includes first and second plates 211 and 212 disposed in axial opposition to each other. The first and second plates 211 and 212, each of which has a circumferentially extending shape, interpose the inertia ring 20 at the both circumferential ends thereof. Each of the first and second plates 211 and 212 is provided with a hole (a hole 211a for the first plate 211 and a hole (not shown in the drawings) for the second plate 212; example of imbalance portion) in one circumferential end thereof (i.e., only on one side). With the hole 211a herein provided, the centrifugal element 21 shown in FIG. 1 has a center of gravity G eccentric to an R1 side in the circumferential direction (i.e., right side in FIG. 2).

It should be noted that similarly to the centrifugal element 21 shown in FIG. 1, another centrifugal element 21, opposed to this centrifugal element 21 through the rotational axis O, also has the center of gravity G eccentric to the R1 side in the circumferential direction. On the other hand, another pair of centrifugal elements 21, displaced in position from the centrifugal element 21 shown in FIG. 1 by an angle of 90 degrees, each has the center of gravity G eccentric to an R2 side in the circumferential direction. Alternatively, all the four centrifugal elements 21 can have centers of gravity G eccentric to the same side in the circumferential direction.

As shown in FIG. 2, each centrifugal element 21 is provided with pins 26 on the both circumferential ends thereof so as to couple the first and second plates 211 and 212 to each other. A collar 27 is disposed on the outer peripheral part of each pin 26 so as to maintain an axial gap between the first and second plates 211 and 212 at a predetermined value. Additionally, each guide roller 231, 232 is provided on the outer peripheral part of the collar 27. It should be noted that in the present preferred embodiment, each guide roller 231, 232 is made in the form of a miniature bearing.

The outer peripheral surface of each guide roller 231, 232 is capable of making contact with the circumferentially outer lateral surface (the support portion 121a, 122a) of each guide protrusion 121, 122. Because of this, even when each centrifugal element 21 tilts, the pair of guide rollers 231 and 232 makes contact with the support portions 121a and 122a, respectively, whereby each centrifugal element 21 can be prevented from jumping out to the outer peripheral side. Additionally, when the guide rollers 231 and 232 make contact with the guide protrusions 121 and 122, respectively, each centrifugal element 21 does not tilt any more from the contact position. Moreover, each centrifugal element 21 is moved while the pair of guide rollers 231 and 232 interposes the guide protrusions 121 and 122 therebetween. Hence, wobble does not occur between each centrifugal element 21 and the hub flange 12 during movement of each centrifugal element 21.

Furthermore, a support pin 28 is fixed to the circumferentially middle part of each centrifugal element 21. A cam follower 30 is rotatably attached to the outer periphery of the support pin 28. The outer peripheral surface of the cam follower 30 makes contact with the cam 31 of the inertia ring 20. In other words, the cam follower 30 is movable along the cam 31. It should be noted that in the present preferred embodiment, the cam follower 30 is made in the form of a bearing.

<Layout of Cam Follower 30 and Guide Rollers 231 and 232>

As shown in a schematic diagram of FIG. 5, the cam follower 30 and the pair of guide rollers 231 and 232 are disposed such that the center (C0) of the cam follower 30 is located on a straight line L connecting the centers (C1 and C2) of the pair of guide rollers 231 and 232. Additionally, the center C0 of the cam follower 30 is located on the midpoint of the straight line L connecting the centers C1 and C2 of the pair of guide rollers 231 and 232.

With the aforementioned layout, when the hub flange 12 and the inertia ring 20 are not being rotated relative to each other, the position of the cam follower 30 does not change regardless of the tilt conditions of each centrifugal element 21 as shown in FIG. 6 with dashed two-dotted lines. In more detail, when the hub flange 12 and the inertia ring 20 are not being rotated relative to each other, the cam follower 30 makes contact with an outermost peripheral point C3 on the cam 31. At this time, with the aforementioned layout of the cam follower 30 and the pair of guide rollers 231 and 232, the contact point C3 between the cam follower 30 and the cam 31 becomes constant regardless of the posture of each centrifugal element 21.

<Cam Mechanism 22>

Each cam mechanism 22 is composed of the cam follower 30 and the cam 31 that corresponds to the circular-arc curved surface 20b of the inertia ring 20. As described above, the cam follower 30 makes contact with the cam 31, and is moved along the cam 31 when the hub flange 12 and the inertia ring 20 are rotated relative to each other within a predetermined angular range.

Although described below in detail, when rotational phase difference is produced between the hub flange 12 and the inertia ring 20 by the contact between the roller 30 and the cam 31, a centrifugal force generated in each centrifugal element 21 is converted into a circumferential force by which the rotational phase difference is reduced.

<Actuation of Cam Mechanism 22>

Actuation of each cam mechanism 22 (inhibition of torque fluctuations) will be explained with FIGS. 5 and 7. In the lock-up on state, a torque transmitted to the front cover 2 is transmitted to the hub flange 12 through the damper part 10.

When torque fluctuations do not exist in torque transmission, the hub flange 12 and the inertia ring 20 are rotated in the condition shown in FIG. 1. In this condition, the cam follower 30 in each cam mechanism 22 makes contact with the outermost peripheral position C3 (circumferential middle position) on the cam 31, and the rotational phase difference between the hub flange 12 and the inertia ring 20 is "0".

As described above, the rotation-directional relative displacement between the hub flange 12 and the inertia ring 20 is referred to as "rotational phase difference". In FIGS. 5 and 7, these terms indicate displacement between the circumferential middle position of the cam 31 and the center position of the cam follower 30.

Figure 7:
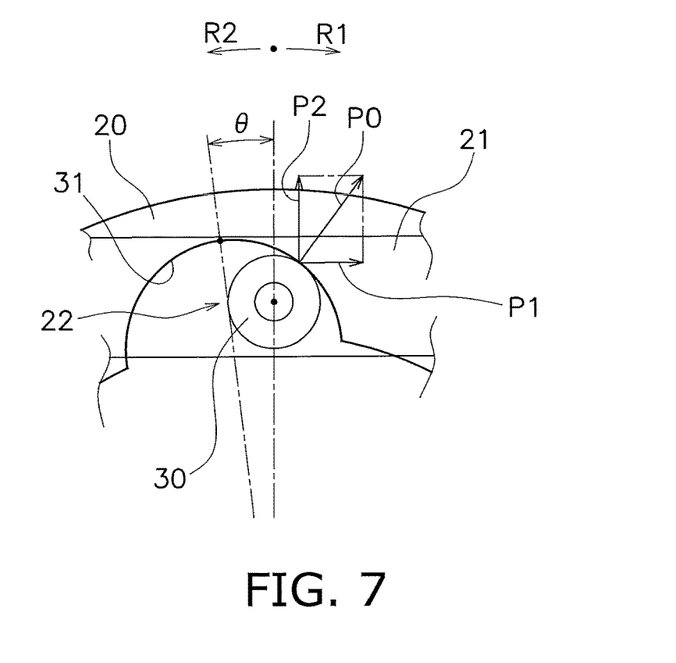
FIG. 7 is a diagram for explaining actuation of each cam mechanism.

When torque fluctuations herein exist in torque transmission, rotational phase difference $\theta$ is produced between the hub flange 12 and the inertia ring 20 as shown in FIG. 7.

As shown in FIG. 7, when the rotational phase difference $\theta$ is produced between the hub flange 12 and the inertia ring 20, the inertia ring 20 is relatively moved to, for instance, the left side (in an R2 direction) in FIG. 7. At this time, a centrifugal force acts on each centrifugal element 21 (i.e., the cam follower 30). Hence, a force to be received by the cam 31 formed on the inertia ring 20 from the cam follower 30 has a direction and a magnitude indicated by P0 in FIG. 7. A first force component P1 and a second force component P2 are produced by the force P0. The first force component P1 is directed in the circumferential direction, whereas the second force component P2 is directed to move the inertia ring 20 radially outward.

Additionally, the first force component P1 acts as a force to move the inertia ring 20 rightward (in an R1 direction) in FIG. 7. In other words, a force directed to reduce the rotational phase difference between the hub flange 12 and the inertia ring 20 is supposed to act on the inertia ring 20.

Moreover, the inertia ring 20 is immovable radially outward. Hence, each centrifugal element 21, by which the cam follower 30 is supported, is supposed to be moved radially inward by a reaction force of the second force component P2.

It should be noted that when the rotational phase difference is reversely produced, the inertia ring 20 is relatively moved to the right side (in the R1 direction) in FIG. 7. However, the aforementioned actuation principle is also true of this case.

As described above, when the rotational phase difference is produced between the hub flange 12 and the inertia ring 20 by torque fluctuations, the inertia ring 20 receives a force (first force component P1) directed to reduce the rotational phase difference between the both by the centrifugal force acting on each centrifugal element 21 and the working of each cam mechanism 22. Torque fluctuations are inhibited by this force.

The aforementioned force inhibiting torque fluctuations varies in accordance with the centrifugal force, in other words, the rotational speed of the hub flange 12, and also varies in accordance with the rotational phase difference and the shape of each cam 31. Therefore, by suitably setting the shape of each cam 31, characteristics of the torque fluctuation inhibiting device 14 can be made optimal in accordance with the specification of the engine and so forth.

For example, each cam 31 can be made in a shape that makes the first force component P1 linearly vary in accordance with the rotational phase difference in a condition where the centrifugal force acting is constant. Alternatively, each cam 31 can be made in a shape that makes the first force component P1 non-linearly vary in accordance with the rotational phase difference.

When a centrifugal force herein acts on each centrifugal element 21, a rotational moment of inertia, oriented in a direction depicted with arrow M in FIG. 6, acts on each centrifugal element 21. Specifically, as described above, the center of gravity G of each centrifugal element 21 is eccentric to the R1 side in the rotational direction. Therefore, when the centrifugal force acts on each centrifugal element 21, the rotational moment of inertia acts on each centrifugal element 21 in the counterclockwise direction about an axis including the center C0 of the cam follower 30 (an axis arranged in parallel to the rotational axis of the hub flange 12) as shown in FIG. 6. When the rotational moment of inertia (M) acts on each centrifugal element 21, each centrifugal element 21 is changed in posture, and the pair of guide rollers 231 and 232 make contact with the circumferentially outer lateral surfaces of the protrusions 121 and 122 of the hub flange 12, respectively.

As described above, when the rotational moment of inertia (M) acts on each centrifugal element 21, the gaps between the guide rollers 231 and 232 of each first centrifugal element 21 and the protrusions 121 and 122 become "0". Then, each centrifugal element 21 is supposed to be radially moved while keeping the posture described above. Consequently, each centrifugal element 21 is stabilized in posture during actuation of each cam mechanism 22.

It should be noted that as described above, one pair of centrifugal elements 21, opposed through the rotational axis, have centers of gravity eccentric to the same direction, whereas the other pair of centrifugal elements 21 have centers of gravity eccentric reversely to those of one pair of centrifugal elements 21. Hence, similar torsional characteristics are obtained on the positive-side torsion angle and the negative-side torsion angle. On the other hand, when all the four centrifugal elements 21 are set to have centrifugal elements eccentric to the same direction, different torsional characteristics can be obtained.

[Exemplary Characteristics]

Figure 8:
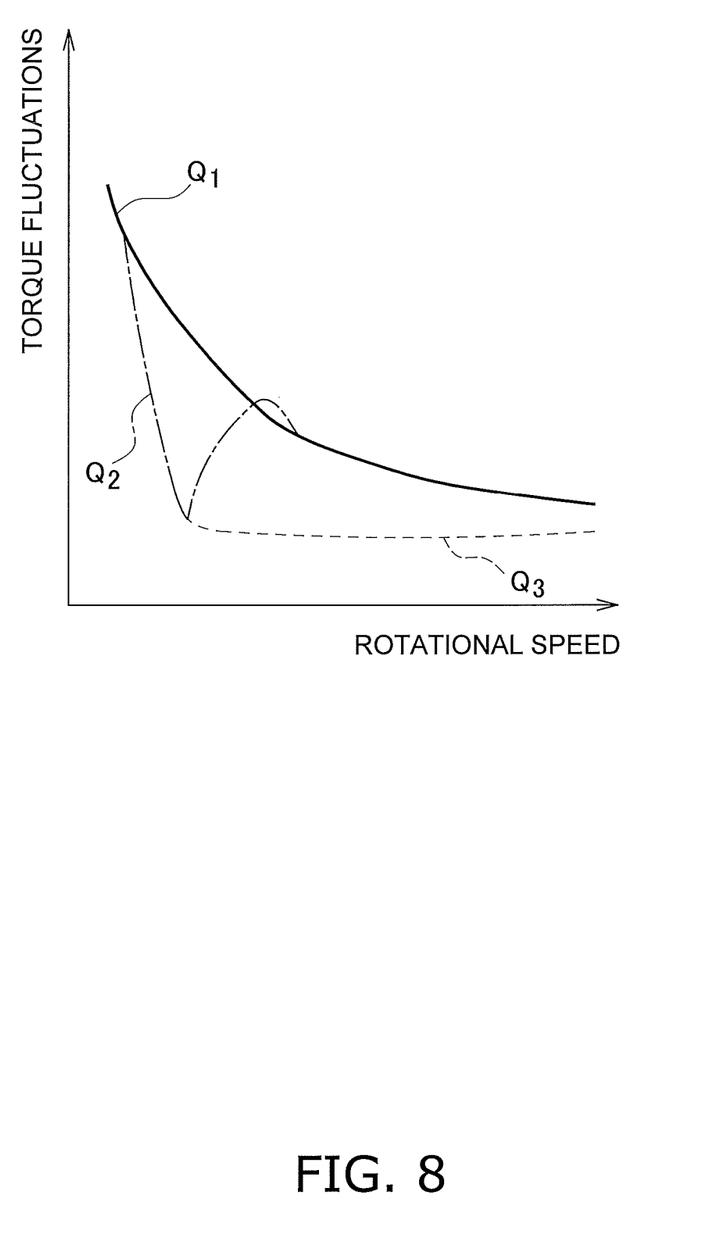
FIG. 8 is a characteristic diagram showing a relation between rotational speed and torque fluctuations.

FIG. 8 is a chart showing exemplary torque fluctuation inhibiting characteristics. The horizontal axis indicates rotational speed, whereas the vertical axis indicates torque fluctuations (rotation velocity fluctuations). Characteristic Q1 indicates a condition without installation of a device for inhibiting torque fluctuations; characteristic Q2 indicates a condition with installation of a well-known dynamic damper device without any cam mechanism; and characteristic Q3 indicates a condition with installation of the torque fluctuation inhibiting device 14 of the present preferred embodiment.

As is obvious from FIG. 8, in an apparatus in which the well-known dynamic damper device without any cam mechanism is installed (characteristic Q2), torque fluctuations can be inhibited only in a specific rotational speed range. By contrast, in the condition with installation of the cam mechanisms 22 of the present preferred embodiment (characteristic Q3), torque fluctuations can be inhibited through the entire rotational speed ranges.

Other Preferred Embodiments

The present disclosure is not limited to the preferred embodiment described above, and a variety of changes or modifications can be made without departing from the scope of the present disclosure.

(a) In the aforementioned preferred embodiment, the cams are provided on the inertia ring, whereas the centrifugal elements are supported by the hub flange. Alternatively, the cams can be provided on the hub flange, whereas the centrifugal elements can be supported by the inertia ring.

(b) In the aforementioned preferred embodiment, the center C0 of the cam follower 30 is set to be located on the straight line L connecting the centers C1 and C2 of the pair of guide rollers 231 and 232. However, the layouts of the respective members are not limited to the above. As long as the center C0 of the cam follower 30 is set to be located approximately on the straight line L, it is possible to obtain advantageous effects similar to those achieved as described above.

Furthermore, as long as the center C0 of the cam follower 30 is set to be located approximately on the midpoint of the straight line L connecting the centers C1 and C2 of the pair of guide rollers 231 and 232, it is possible to obtain advantageous effects similar to those achieved as described above.

(c) In the aforementioned preferred embodiment, each cam is made in the shape of a circular arc having a constant curvature. Alternatively, each cam can be made in the shape of a curve having a plurality of curvatures.

(d) In the aforementioned preferred embodiment, the present disclosure is applied to the lock-up device for the torque converter. However, the torque fluctuation inhibiting device of the present disclosure is also applicable to other power transmission devices. In this case, the torque fluctuation inhibiting device can be disposed in a variety of layouts.

Moreover, the torque fluctuation inhibiting device of the present disclosure can be further applied to a heretofore well-known dynamic damper device or a power transmission device provided with a pendulum-type damper device.

REFERENCE SIGNS LIST

1 Torque converter
12 Hub flange (rotor)
121, 122 Guide protrusion
121a, 122a Support portion
14 Torque fluctuation inhibiting device
20 Inertia ring (mass body)
21 Centrifugal element
211a Hole (imbalance portion)
22 Cam mechanism
231, 232 Guide roller
26 Pin
30 Cam follower
31 Cam

What is claimed is:

1. A torque fluctuation inhibiting device configured to inhibit torque fluctuations in a rotor to which a torque is inputted, the torque fluctuation inhibiting device comprising:
   a mass body disposed to be rotatable in accordance with the rotor and be rotatable relative to the rotor; and
   a plurality of centrifugal elements radially movable, each of the plurality of centrifugal elements disposed to receive centrifugal force generated by rotation of the rotor and the mass body,
   wherein each of the plurality of centrifugal elements is provided with a respective cam follower,
   each of the plurality of centrifugal elements is provided with and guided by a respective pair of guide members while supported by one of the rotor and the mass body, the respective cam follower is disposed on a respective first straight line connecting the respective pair of guide members,
   each of the plurality of centrifugal elements has a respective first circumferential end and a respective second circumferential end opposite and spaced from the respective first circumferential end,
   for each of the plurality of centrifugal elements, a respective first one of the respective pair of guide members is disposed at the respective first circumferential end and a respective second one of the respective pair of guide members is disposed at the respective second circumferential end,
   for each of the plurality of centrifugal elements, each of the respective pair of guide members is separated by a respective gap from a respective guide protrusion extending from the rotor such that each of the plurality of centrifugal elements is rotatable about a respective center of the respective cam follower, and
   for each of the plurality of centrifugal elements, a respective cam is provided on the other of the rotor and the mass body and the respective cam interacting with the respective cam follower to define a respective cam mechanism, the respective cam mechanism converting the centrifugal force into a respective circumferential force by the respective cam follower moving along the respective cam when a relative displacement is produced between the rotor and the mass body in a rotational direction, the respective circumferential force directed to reduce the relative displacement.

2. The torque fluctuation inhibiting device according to claim 1, wherein
   for each of the plurality of centrifugal elements, each of the respective pair of guide members has a respective circular cross section and the respective cam follower has a circular cross section,
   for each of the plurality of centrifugal elements, each of the respective pair of guide members has a respective center, the respective cam follower has a respective center, a respective second straight line connects the respective centers of the respective pair of guide members and the respective center of the respective cam follower.

3. The torque fluctuation inhibiting device according to claim 2, wherein
   for each of the plurality of centrifugal elements, the respective center of the respective cam follower is disposed on a respective midpoint of the respective second straight line.

4. The torque fluctuation inhibiting device according to claim 1, wherein
   the mass body has an annular shape, and
   for each of the plurality of centrifugal elements, the respective cam is provided on a respective part of the mass body, the respective cam having a respective curved surface recessed radially outward in a respective circular-arc shape.

5. The torque fluctuation inhibiting device according to claim 4, wherein
   for each of the plurality of centrifugal elements, the respective cam follower is disposed to contact a respective outermost peripheral point on the respective cam while the rotor and the mass body are prevented from being rotated relative to each other, and
   for each of the plurality of centrifugal elements, a respective contact point between the respective cam and the respective cam follower is constant regardless of a respective posture of each of the plurality of centrifugal elements while the rotor and the mass body are prevented from being rotated relative to each other.

6. The torque fluctuation inhibiting device according to claim 1, wherein
   for each of the plurality of centrifugal elements, each of the respective pair of guide members is a respective guide roller.

7. The torque fluctuation inhibiting device according to claim 1, wherein
   for each of the plurality of centrifugal elements, the respective cam follower is a respective roller.

8. The torque fluctuation inhibiting device according to claim 1, wherein
   each of the plurality of centrifugal elements has a respective circumferentially extending shape, and
   each of the plurality of centrifugal elements includes a respective imbalance portion configured to set a respective center of gravity thereof to deviate from a respective circumferential center thereof to a respective one circumferential side.

9. The torque fluctuation inhibiting device according to claim 1, wherein
   each of the plurality of centrifugal elements includes a respective first plate extending circumferentially and a respective second plate extending circumferentially, the respective first and second plates axially opposed to each other, and
   for each of the plurality of centrifugal elements, each of the respective pair of guide members includes
   a respective pin configured to fix to the respective first plate and the respective second plate, and
   a respective guide roller rotatably supported by the respective pin.

* * * * *